Figure 3:
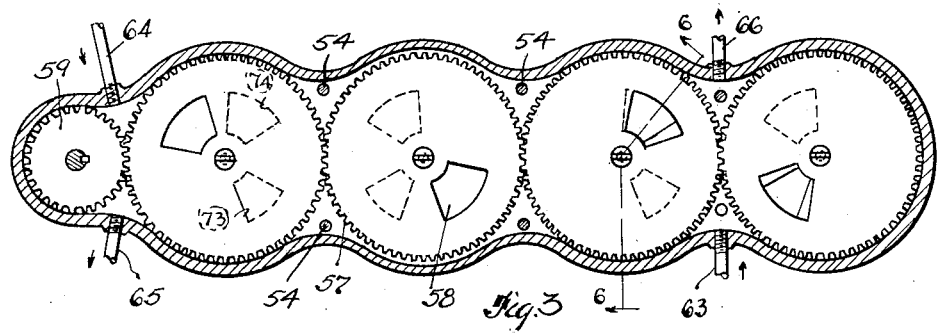

Oct. 18, 1932.    A. D. SNYDER    1,883,038
INTERNAL COMBUSTION ENGINE AND VALVE CONSTRUCTION
Filed Feb. 5, 1925    2 Sheets-Sheet 1
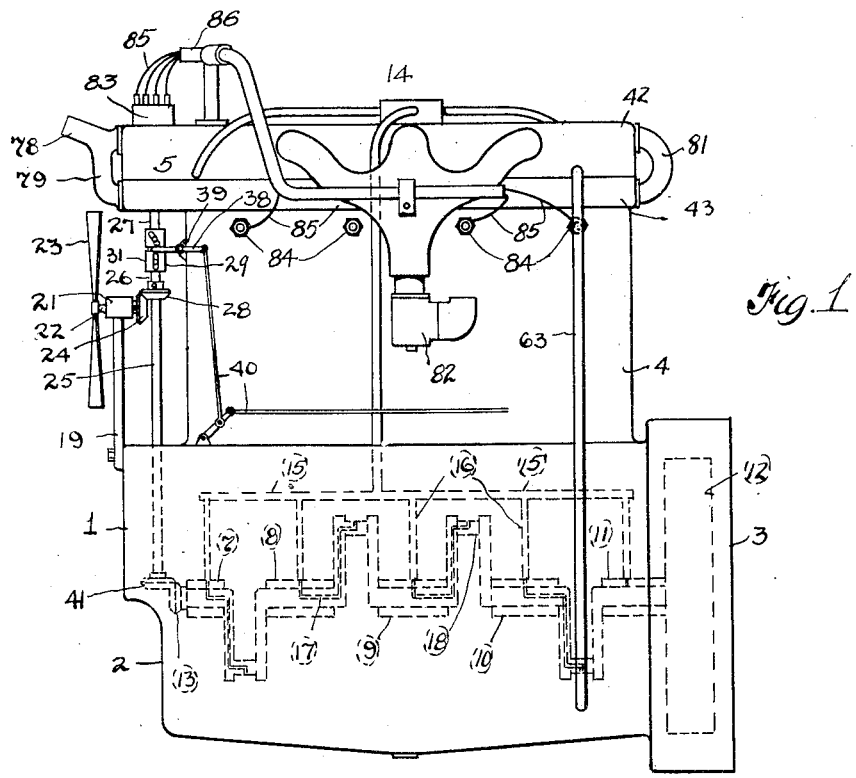
Fig. 1
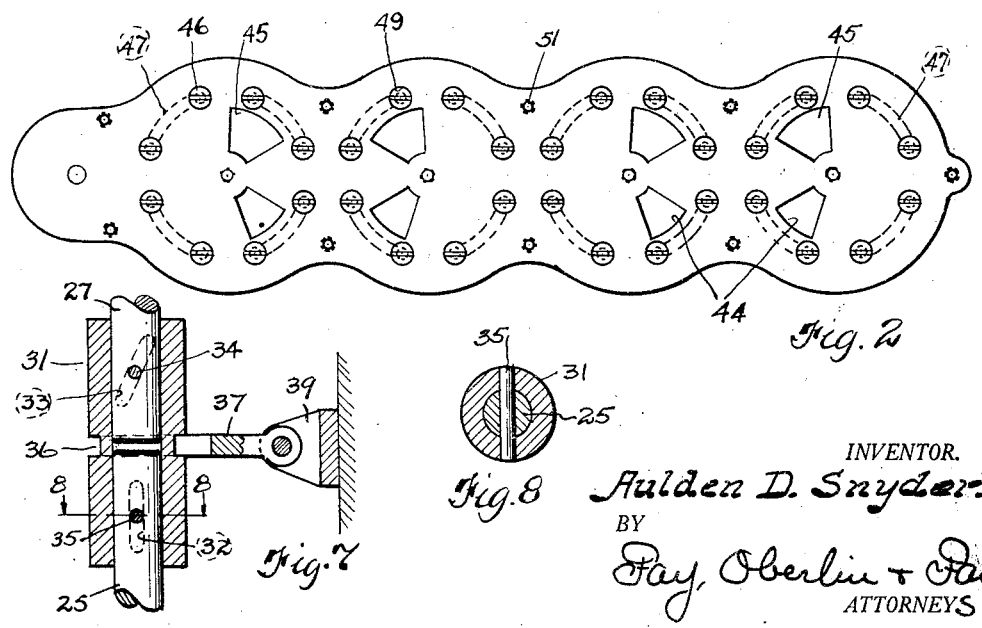
Fig. 2
Fig. 7
Fig. 8
INVENTOR.
Aulden D. Snyder
BY
Fay, Oberlin & Fay
ATTORNEYS Oct. 18, 1932.  A. D. SNYDER  1,883,038
INTERNAL COMBUSTION ENGINE AND VALVE CONSTRUCTION
Filed Feb. 5, 1925   2 Sheets-Sheet 2

INVENTOR.
Aulden D. Snyder
BY
Fay, Oberlin & Fay
ATTORNEYS

Patented Oct. 18, 1932

1,883,038

UNITED STATES PATENT OFFICE

AULDEN D. SNYDER, OF CLEVELAND, OHIO

INTERNAL COMBUSTION ENGINE AND VALVE CONSTRUCTION

Application filed February 5, 1925. Serial No. 6,955.

This invention, as indicated, relates to an internal combustion engine and valve construction. More particularly it comprises an engine having one or more rotatable valves which control the admission and exhaust of the gases. The valves are adapted to be actuated by circumferential gears formed on the valve discs and said gears are so related to the enclosing casing as to produce a suction and serve the function of an oil pump. The invention also includes a novel type of sectional cylinder head and oil circulating and distributing system, and an improved valve timing and ignition timing control.

The principal object of the present invention is to provide an internal combustion engine having an improved cylinder head, valve construction, oiling system and valve and ignition timing control. Another object is to provide an improved valve construction which will function with absolute certainty and be free of the difficulties often found in engines equipped with poppet valves which do not seat accurately at times and often produce irregular action of the motor because of the valve stems sticking in their guides. Another object of the invention is to combine with the valve mechanism of the engine an efficient oil distributing system which will at all times insure an adequate supply of oil both to the valve gears and to the operative parts of the engine. A further object of the invention is to provide a sectional cylinder head which may be readily removed from the engine for purposes of adjustment and repair. Another object is to provide an improved internal combustion engine having an improved valve timing adjustment, an improved ignition timing device, and also to combine, if desired, simultaneous valve timing and ignition timing adjustment. Another object is to provide a detachable cylinder head unit which may be substituted for standard cylinder heads and to provide for various automobile engines improved valve, lubrication, and timing mechanism. Other objects of the invention will appear in the course of the following description. It is to be understood that while a single cylinder block type of internal combustion engine with a single fly wheel is shown and described in this application, that the principle of the invention is not to be limited to such particular construction and that many of the special features of the invention are of value in connection with wholly different applications than those illustrated. To the accomplishment of the foregoing and related ends, said invention, then, consists of the means hereinafter fully described and particularly pointed out in the claims. The annexed drawings and the following description set forth in detail certain mechanism embodying the invention, such disclosed means constituting, however, but one of various mechanical forms in which the principle of the invention may be used.

In said annexed drawings:—

Figure 4:
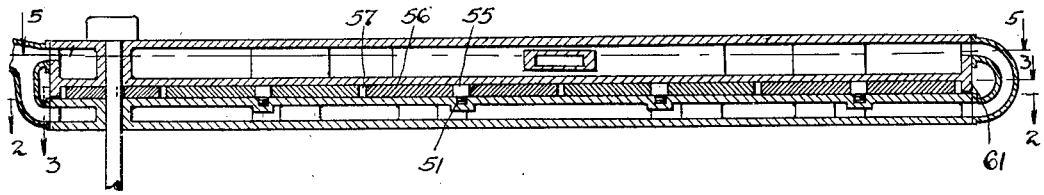
Figure 5:
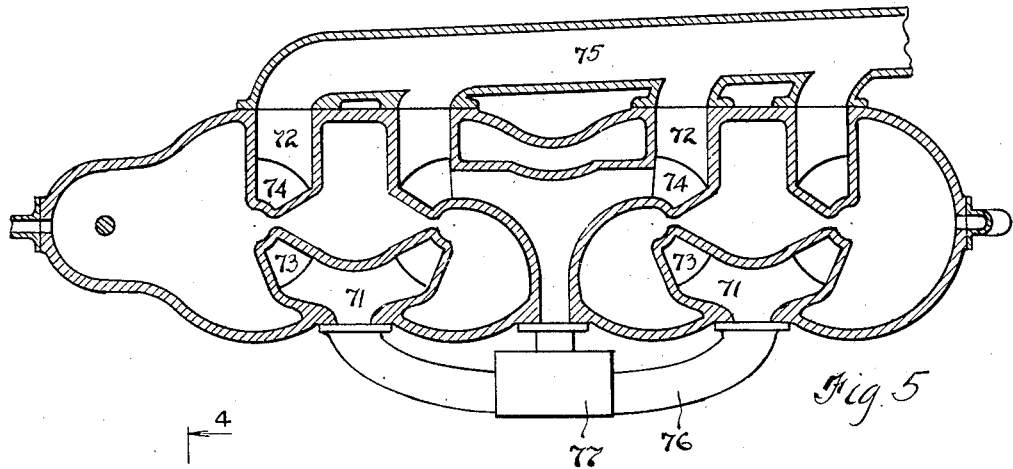
Figure 6:
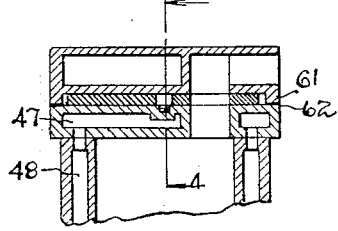

Fig. 1 is a side elevation of an internal combustion engine embodying the principles of my invention; Fig. 2 is a top plan view of the upper face of the lower cylinder head, taken along the line 2—2 shown in Fig. 4, looking in the direction of the arrows, showing the water cooled valve ports for the disc valve gears; Fig. 3 is a horizontal sectional view through the upper cylinder head, taken along the line 3—3 shown in Fig. 4, looking in the direction of the arrows; Fig. 4 is a longitudinal vertical sectional view taken centrally through the assembled upper and lower cylinder heads, along the line 4—4 shown in Fig. 6, looking in the direction of the arrows; Fig. 5 is a horizontal sectional view through the upper cylinder head, taken along the line 5—5 shown in Fig. 4, looking in the direction of the arrows; Fig. 6 is a vertical sectional view taken along the line 6—6 shown in Fig. 3, looking in the direction of the arrows; Fig. 7 is a front elevation, partially in section, of the valve timing adjustment; and Fig. 8 is a sectional view of the timing control sleeve taken along the line 8—8 shown in Fig. 7, looking in the direction of the arrows.

As is shown in Fig. 1 of the drawings, the internal combustion engine comprises the usual upper and lower crank case 1, 2, with a fly wheel housing 3 mounted at the rearward end thereof. A cylinder block 4 is secured to the upper face of the crank case and a cylinder head 5 is firmly secured to the upper end of the cylinder block.

The crank shaft 6 is suitably journaled in the crank case, five bearings 7, 8, 9, 10, 11, being employed in the four cylinder engine illustrated. A fly wheel 12 is mounted upon the rearward end of the crank shaft and a bevel gear 13 at its forward end.

The crank shaft bearings are lubricated from an oil distributor reservoir 14 supported on the top of the engine block, which supplies oil through a vertical conduit to a horizontal distributor tube 15 supported within the crank case and having five branch tubes 16 leading to each main crank shaft bearing. The crank shaft is provided with drilled oil passageways or internal conduits 17 leading from the main bearings to the respective connecting rod bearings 18.

At the forward end of the crank case a vertical support or standard 19 is provided. Said standard is bolted at its lower end to the crank case and carries at its upper end a journal 21 for the fan shaft 22. The fan shaft carries the fan blades 23 at its forward end and a bevel gear 24 at its rearward end.

A vertical drive shaft 25, having an upper and lower section 26, 27, is provided immediately at the rear of the fan shaft standard and extends from a point adjacent the forward crank shaft bearing 7, to a position above the cylinder head. Said vertical drive shaft is suitably journaled within the crank case and cylinder head and carries at an intermediate position a bevel gear 28 engaging the bevel gear 24 on the fan shaft.

Immediately above the bevel gear on the drive shaft a valve timing adjusting mechanism 29 is provided. This mechanism comprises a sleeve 31 having a straight, vertical slot 32 and a vertical cam slot 33 engaging, respectively, over pins 34, 35, projecting outwardly from the adjacent ends of the upper and lower drive shaft sections. The sleeve has a central circumferential groove 36 adapted to be engaged by a yoke 37 operated in well-known manner by a shifting lever 38 pivoted upon a bracket 39 mounted on the forward end of the cylinder block. The position of the shifting lever may be controlled from the driver's seat by a system of shafts and links 40 in the usual manner.

At the lower end of the vertical drive shaft a bevel gear 41 is provided which engages the bevel gear 13, and thus transmits motion from the crank shaft to the drive shaft and thence to the rotary valves and distributor, as will be presently described.

The cylinder head 5 is formed in two sections which, for convenience of description, will be designated the upper cylinder head 42 and the lower cylinder head 43.

The lower cylinder head is provided with water jacketed inlet and exhaust ports 44, 45, of segmental outline, for each of the respective cylinders, and is bolted to the top of the cylinder block by a series of countersunk bolts 46. The water jacket is provided with passageways 47 registering with like passageways 48 in the cylinder block in order to provide for free water circulation about the cylinders and through the lower cylinder head. The upper side of the lower cylinder head is a plane surface, except for the counterbored holes 49 for the heads of the bolts fastening the lower head to the cylinder block and a series of tapped holes 51 provided at spaced intervals to receive the screw-threaded ends 52 of the pivot pins 53 upon which the respective valve discs are mounted, and a marginal series of tapped holes 54 to receive the screw-threaded ends of the bolts 55 for securing the upper cylinder head in position.

The valve discs 56 comprise circular discs of plane upper and lower surfaces and have peripheral gear teeth 57. Each valve disc is of identical size and shape for each cylinder and is provided with a single port 58 of segmental outline for controlling both the admission and exhaust of the gases through the ports of the cylinder head.

When the valve discs are seated in alignment upon their respective pivot pins the gear teeth of adjacent discs will be interengaged, and the adjacent discs will rotate in opposite directions. A pinion 59 of half the circumferential size of the valve discs and having gear teeth of similar size is keyed to the upper portion of the vertical drive shaft 25 and engages the gear teeth on the forward valve disc. Thus, upon the rotation of the drive shaft through its bevel gear connection with the crank shaft, the series of valve discs will be driven at one-half the speed of the crank shaft.

The upper cylinder head provides the housing or valve chamber for the valve discs, being provided on its under side with a raised edge 61, about its marginal portion, of a height slightly less than the thickness of one of the valve discs, which is fitted against the margins of the lower cylinder head, with laminated shims or spacers 62 interposed. Through accurate control of the shim thickness the valve chamber may be adjusted to the proper height to afford the most effective working clearance for the valve discs. These laminated spacers thus are positioned in a plane closely parallel to the central plane of the valves.

The raised edge extends closely adjacent the sides of all but the second of the valve discs in order that the gear teeth on the peripheries thereof will function as gear pumps for distributing the lubricating oil about the valve mechanism and throughout the engine. An oil supply pipe 63 extends from the side of the upper cylinder head adjacent its rearward end downwardly into the lower crank case oil reservoir and oil is drawn upwardly therethrough by the suction action of the valve discs. A similar supply pipe 64 is provided upon the opposite side of the upper cylinder head adjacent the forward end, as is clearly shown in Fig. 3 of the drawings. Opposite each of the oil supply pipes an oil outlet pipe 65, 66, is provided, said oil outlet pipes extending to an oil reservoir at the top of the cylinder block, which forms part of an oil distributing system, as heretofore described.

The upper cylinder head is provided with water jacketed inlet and exhaust passageways 71, 72, leading to valve ports 73, 74, in vertical alignment with those in the lower cylinder head and of identical size therewith.

The intake and exhaust connections are made to the respective sides of the upper cylinder head. A standard exhaust manifold 75, having four branches, is bolted to the right-hand side of the upper head. The intake manifold 76 is bolted to the left-hand side of the upper head and comprises two branches, each branch supplying two adjacent cylinders, through the gas passageways formed within the upper cylinder head. The design is such that the gas passageways are of equal length for each cylinder, which insures even operation of the motor.

As is shown in Figs. 1 and 5, an exhaust heater jacket or preheater 77 extends about the junction point of the intake manifold branches from within the upper cylinder head.

At the forward end of the upper cylinder head a tubular radiator connection 78 is provided, said connection having a branch 79 extending to the lower cylinder head. At the rearward portion of the assembled cylinder head sections a U-shaped tubular connection 81 is provided to allow free circulation of the water in the water jackets of said sections.

The intake manifold is supplied through a carburetor 82, or a carburetor connection, with any desired combustion mixture, such as gasoline and air, gasoline and water vapor, water gas, or any other combination of satisfactory quality.

The vertical drive shaft 25 extends upward through both cylinder head sections and carries at its extreme upper end with suitable reduction gearing the rotor of a distributor 83 forming part of an ignition system of standard design. The distributor is connected with the spark plugs 84 by conductor cables 85, suitably insulated and carried in a conduit 86 from the distributor to points adjacent the respective spark plugs. Through the adjustment of the relative position of the upper and lower drive shaft sections 26, 27, both the valve timing and ignition timing may be simultaneously controlled. Thus a wide range of rotation speeds of the engine is provided for.

The operation of the engine has been partly indicated in connection with the above description of its construction. It might be pointed out, however, that in the view shown in Fig. 3 of the drawings, the disc valve of the forward cylinder is in the position at which explosion of the combustion gases takes place; the second disc valve is in the compression position; the third disc valve is in the exhaust position with the exhaust port wide open; and the rearward disc valve is in the intake position with the inlet port wide open. In Fig. 6 of the drawings the disc valve over the third cylinder from the front of the engine is shown with its opening over the aligned exhaust ports of the lower cylinder heads. A thin film of oil is at all times maintained over the greater portion of the upper and lower surfaces of the disc valves. This is particularly true of the upper surfaces which take the thrust of the explosions within the cylinders.

Some of the advantages of my invention have already been pointed out, but it may be added that a considerable reduction in the number of moving parts is brought about by the improved valve mechanism. When wear occurs the laminated shims provide for simple and accurate adjustment. Much longer motor life will thus be provided for, the amount of friction per horse power being a very low factor. The removal of carbon is unnecessary.

The positive valve action and accurate control of the valve and ignition timing makes a single motor readily adaptable for various uses. Thus the identical motor may be transferred from a tractor to an aeroplane and the change of the timing at the will of the operator will adapt the motor at once for the other specialized use.

The advantages mentioned may also be supplied to many motors of standard construction by supplying in place of the cylinder heads now in use, a detachable head having the necessary connections as above described.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. An apparatus of the character described, having in combination a cylinder block, a head provided on the upper side thereof, inlet and exhaust passageways formed through said head, cooling chambers surrounding said passageways, and a plurality of intermeshing gear disc rotatable valves flat on each face and mounted on pins within said head, serving as an oil distributing pump, and adapted to control the admission and exhaust of gases to and from said cylinder block, each of said valves being enclosed and rotatable on a vertical axis coincident with the axis of the cylinder.

2. An apparatus of the character described, having in combination a cylinder block, a head detachably secured to the upper side thereof, inlet and exhaust passageways formed through said head, a plurality of rotatable valve discs flat on each face and mounted on pins within said head, serving as an oil distributing pump, and each adapted to control the admission and exhaust of gases to and from a single cylinder of said engine block, and means for rotating said disc, each of said valves being enclosed and rotatable on a vertical axis coincident with the axis of the cylinder.

3. An apparatus of the character described, having in combination a plurality of aligned engine cylinders, a head adapted to be secured thereto comprising two superimposed sections, a plurality of gas passageways formed through said head sections, a plurality of aligned disc valves flat on each face and mounted on pins housed within said head, a plurality of peripheral teeth formed upon each of said disc valves and interengaging the teeth of adjacent valves, an interior wall provided within said head surrounding said disc valves, providing an oil chamber and forming constricted oil passageways adjacent the peripheries of certain of said valves, and means for rotating said valves for opening and closing said gas passageways and forcing oil through said oil chamber.

4. An apparatus of the character described, having in combination a plurality of aligned engine cylinders, a head adapted to be secured thereto comprising two superimposed sections, a plurality of gas passageways formed through said head sections, a plurality of aligned disc valves flat on each face and mounted on pins housed within said head, teeth formed upon each of said disc valves and interengaging the teeth of adjacent valves, an interior wall provided within said head surrounding said disc valves, providing an oil chamber and forming constricted oil passageways adjacent the peripheries of certain of said valves, a plurality of oil conduits connected with said oil chamber, and means for rotating said valves for opening and closing said gas passageways and forcing oil through said oil chamber and conduits.

5. An apparatus of the character described, having in combination a plurality of aligned engine cylinders, a head adapted to be secured thereto comprising two superimposed sections, a plurality of gas passageways formed through said head sections, a plurality of aligned disc valves flat on each face and mounted on pins housed within said head, a plurality of peripheral teeth formed upon each of said disc valves and interengaging the teeth of adjacent valves, an interior wall provided within said head surrounding said disc valves, providing an oil chamber and forming constricted oil passageways adjacent the peripheries of certain of said valves, a plurality of oil conduits connected with said oil chamber, an oil distributing system associated with said conduits, and means for rotating said valves for opening and closing said gas passageways and forcing oil through said oil chamber and said oil distributing system.

6. An apparatus of the character described, having in combination a plurality of aligned engine cylinders, a head adapted to be secured thereto comprising two superimposed sections, a plurality of gas passageways formed through said head sections, a plurality of aligned disc valves flat on each face and mounted on pins housed within said head, a plurality of peripheral teeth formed upon each of said disc valves and interengaging the teeth of adjacent valves, an interior wall provided within said head surrounding said disc valves, providing an oil chamber and forming constricted oil passageways adjacent the peripheries of certain of said valves, means for varying the height of said oil chamber, and means for rotating said valves for opening and closing said gas passageways and forcing oil through said oil chamber.

7. In a gas engine a plurality of geared discs positioned in a chamber above the cylinders and serving as a valve mechanism and as an oil pump for said engine.

Signed by me, this 17th day of January, 1925.

AULDEN D. SNYDER.